United States Patent [19]
Brush, II et al.

[11] Patent Number: 5,982,372
[45] Date of Patent: Nov. 9, 1999

[54] VISUAL METAPHOR FOR SHORTCUT NAVIGATION IN A VIRTUAL WORLD

[75] Inventors: Abbott Purdy Brush, II, Woodbridge, Conn.; Gennaro A. Cuomo, Apex, N.C.; Sarah D. Redpath, Cary, N.C.; David Bruce Lection; Donald Robert Wood, both of Raleigh, N.C.

[73] Assignee: International Business Machines Corp., Armonk, N.Y.

[21] Appl. No.: 08/746,691

[22] Filed: Nov. 14, 1996

[51] Int. Cl.⁶ .................................................. G06T 15/00
[52] U.S. Cl. ............................................ 345/418; 345/419
[58] Field of Search .................................. 345/418, 419, 345/420, 429

[56] References Cited

U.S. PATENT DOCUMENTS

| | | | |
|---|---|---|---|
| 5,490,239 | 2/1996 | Myers | 345/429 |
| 5,682,506 | 10/1997 | Corby, Jr. et al. | 345/419 |
| 5,684,943 | 11/1997 | Abraham et al. | 345/473 |
| 5,734,805 | 3/1998 | Isensee et al. | 345/419 |

*Primary Examiner*—Phu K. Nguyen
*Assistant Examiner*—Cliff N. Vo
*Attorney, Agent, or Firm*—Gregory M. Doudnikoff

[57] ABSTRACT

A technique for providing enhanced intuitive navigation in a virtual world. User selectable hot spots are provided within a virtual world that users may select to automatically be moved to predetermined move-to coordinates within the virtual world. The user may be transported directly to the move-to coordinates or the user may have its motion controlled by the virtual world to in essence walk the user to the move-to coordinates within the virtual world. The selectable hot spot may become inactive following selection of the hot spot by a user until the user moves off of the move-to coordinates, or a plurality of move-to coordinates may be provided such that the hot spot remains active until all of the move-to coordinates are occupied by users. Additionally, the hot spot may be visually enhanced to make it easier to be seen and selected when the user is more than a predetermined distance from the hot spot within the virtual world.

15 Claims, 9 Drawing Sheets

VISUAL METAPHOR FOR SHORTCUT NAVIGATION IN A VIRTUAL WORLD

BACKGROUND OF THE INVENTION

1. Field of the Invention

The present invention relates to a technique for providing a participant in a virtual world with means for intuitively navigating through the virtual world more quickly. More particularly, the present invention relates to a technique for providing selectable navigation hot spots in a virtual world which a user may select to automatically move to a hot spot associated location in the virtual world.

2. Description of the Related Art

The Internet has existed for a number of years as a means for exchanging information. The first phase in the development of the Internet was the development of a TCP/IP infrastructure which permitted documents and data to be stored on a networked system of computers which permitted access of the documents by users of the Internet. This system was difficult to use, as access was restricted to serious or expert level computer users who could maintain internal cognitive maps of data space.

The next phase of the Internet development was the development of the World Wide Web, which is a hypermedia system which added another layer of abstraction to the existing Internet structure. This abstraction provided an addressing scheme in the form of a unique identifier or universal resource locator (URL). With this system, anyone could tell where to go and how to get there for any document or piece of data within the Web. This permitted use by novice computer users. However, the only form of navigation consisted of direct reference in the form of a URL such as "http:\\www.ibm.com\". In combination with Internet search engines that have been developed for finding URLs for information on the Web, the World Wide Web now provides a retrieval mechanism which compliments the original storage mechanism of the Internet. Still, the system is not entirely user friendly as the user must rely on rigid addressing standards, search engines for finding URLs/ addresses, and links within documents to navigate through the World Wide Web.

The recent explosion in popularity of the Internet can be attributed to a number of factors, the advent of the World Wide Web among them. Another factor has been the decreasing cost of computers and related technologies, and the increases in the speed of communication via high speed modems and the like. This has made possible the graphic-rich portion of the Internet, which is accessed via the World Wide Web. This graphic rich content has given the Internet the mass appeal that it previously lacked.

In the World Wide Web, documents or sites are typically written in the definition language known as Hypertext Markup Language (HTML). Until very recently, the World Wide Web comprised sites which include almost exclusively two dimensional graphics. This was due in part to limitations inherent in HTML. The Internet itself is a large number of computers networked together which contains a large number of sites. Each site has its own unique URL which identifies the computer on the Internet on which the site resides. Typically, a user accesses a site on the Internet from a personal computer via a phone line to an Internet service provider which links the user to the Internet. The user needs Web browser software, such as Netscape Navigator from Netscape Communications Corporation or WebExplorer from the International Business Machines Corporation (IBM), on his or her computer in order to view most World Wide Web content on the Internet. The Web browser software is able to display the HTML content of World Wide Web sites on the user's monitor.

While it was the advent of two dimensional graphically intense Web sites that spurred the popularity of the Internet, the next level of technology may bring Internets, internal networks such as intranets, and networks in general to a new level. This third phase of Internet development has been the introduction of intranetworks, which are essentially documents and their data (World Wide Web sites) which have been rendered sensually. That is, a user interacts or exists within a site or intranetwork and experiences and perceives the site from within. This new Internet technology involves three dimensional technology which permits simulation of real world objects. The three dimensional technology, also known as virtual reality, permits users to enter three dimensional worlds. Additionally, this three dimensional phase of the Internet permits worlds in which actual people actually participate interactively with each other.

However, this technology is still embryonic. The technology is written in a definition language known as Virtual Reality Modelling Language (VRML). VRML is a language for describing multi-participant interactive simulations in virtual worlds networked via the global Internet and hyperlinked with the World Wide Web. To appropriately view or access a VRML document or site on the World Wide Web, a user is required to have an appropriate VRML viewer or browser in addition to (or in combination with) a Web browser.

As virtual worlds become a reality, virtual worlds will provide a number of advantages over two dimensional documents that will become apparent. Three dimensional worlds hold a promising future in the area of electronic commerce, as users of an electronic store or electronic mall can shop through the store and see the items that are available. It is also anticipated that virtual worlds will become prevalent in business and social environments as well.

However, virtual worlds in use today lack a number of systems and characteristics which will make them more acceptable to the general public and enhance usability. One current problem with virtual worlds is that it is difficult for a user to navigate his or her avatar through a virtual world in order to see what is to be seen and participate in the activities available in the virtual world. Basically, a user navigates his avatar through a virtual world using a set of sometimes awkward controls which are manipulated via a mouse to perform something akin to a human walking. The user's viewpoint or visual perspective is that of the avatar; that is, the user sees what the avatar sees. With these controls, the user controls the direction and speed in which the avatar walks, where the avatar looks, etc. Such interaction with a virtual world can be relatively slow. One solution to this problem is proposed in "The VRML 2.0 Handbook" by J. Hartman and J. Wernecke at pages 160–168. This solution provides signs which users may select to take a predetermined animated tour of the virtual world, preferably via a conveyance of some type, such as a train or moving sidewalk. Thus, users may be provided automatic tours of a virtual world. However, this solution certainly does not address all aspects of the navigation difficulties that users encounter in a virtual world.

Accordingly, a need exists for an enhanced mechanism for permitting a user to navigate through a virtual world.

SUMMARY OF THE INVENTION

An object of the present invention is to provide a technique for enabling enhanced intuitive navigation in a virtual world.

Another object of the present invention is to permit participants in a virtual world to more quickly identify items of interest in a virtual world and positions within a virtual world at which a user must be in order to interact more fully with features of the virtual world.

Another object of the present invention is to provide a virtual world navigation technique for permitting intuitive navigation through a virtual world to important sites therein.

Other objects and advantages of the present invention will be set forth in part in the description and the drawings which follow, and, in part, will be obvious from the description or may be learned by practice of the invention.

The present invention will now be described with reference to the following drawings, in which like reference numbers denote the same element throughout.

DESCRIPTION OF THE PREFERRED EMBODIMENT

Figure 1:
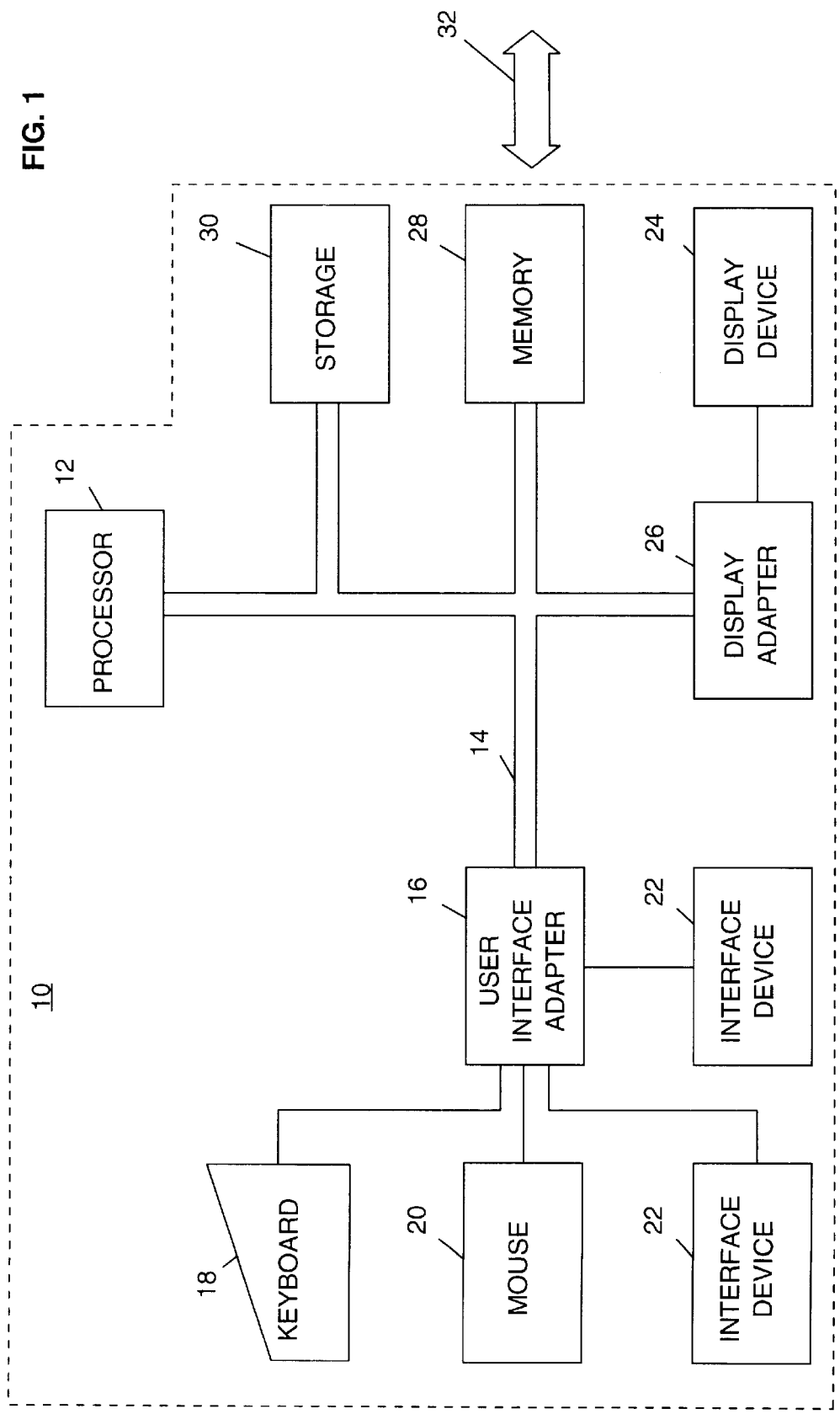
FIG. 1 is a block diagram of a computer workstation environment in which the present invention may be practised.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide are network, or the workstation 10 can be client in a client/server arrangement with another computer, etc. All of these configurations, as well as the appropriate communications hardware and software, are known in the art.

Figure 2:
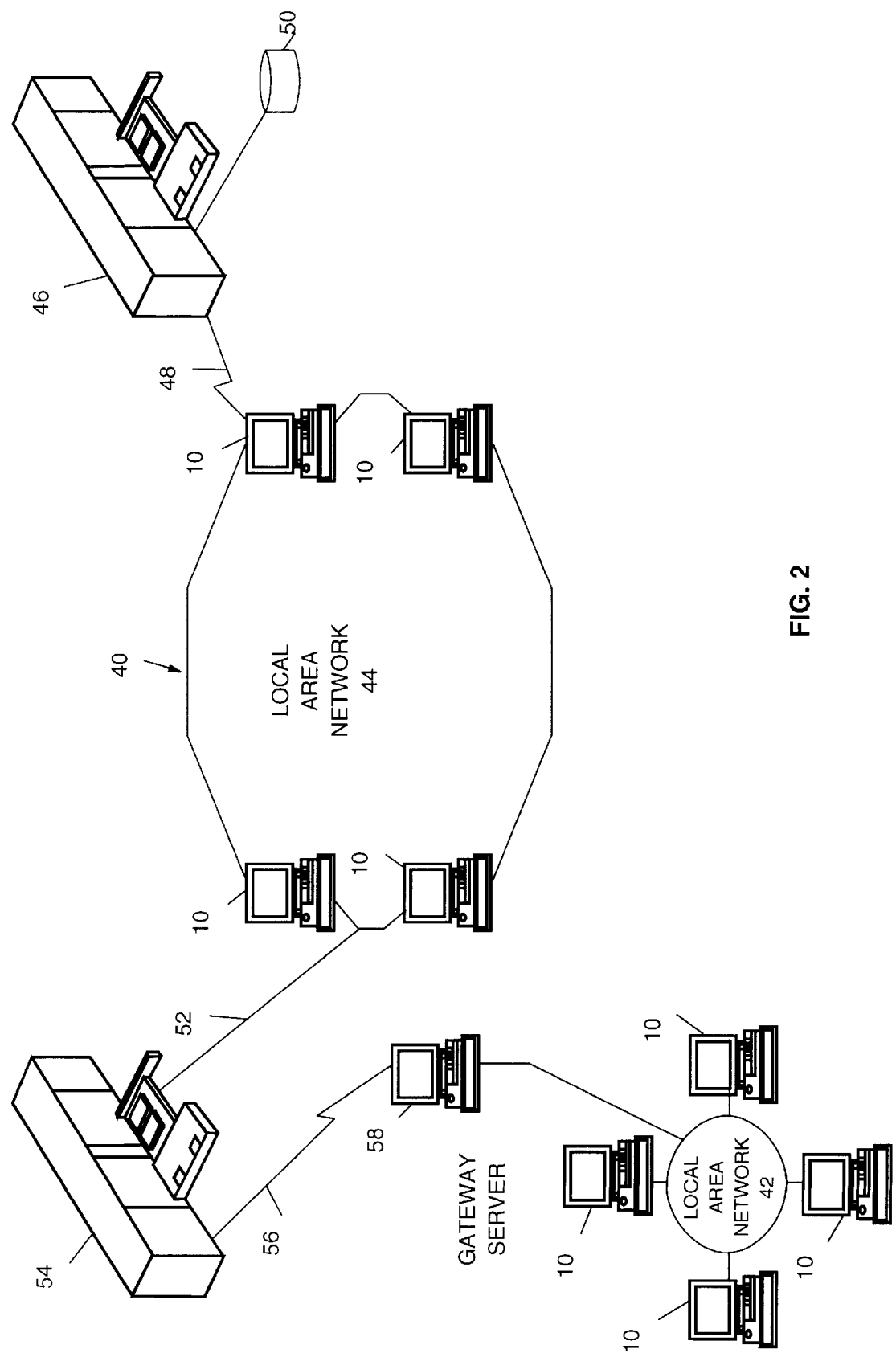
FIG. 2 is a diagram of a networked computing environment in which the present invention may be practised.

FIG. 2 illustrates a data processing network 40 in which the present invention may be practised. The data processing network 40 may be the Internet, Intranet or the like, and includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange such as an Application System/400 (also known as an AS/400) may be employed. "Enterprise Systems Architecture/370" and "Enterprise Systems Architecture/390" are trademarks of IBM; "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 8. In the preferred embodiment, a virtual world, including resident objects and participants, are implemented in the VRML language and resides on a server in a network.

Figure 3:
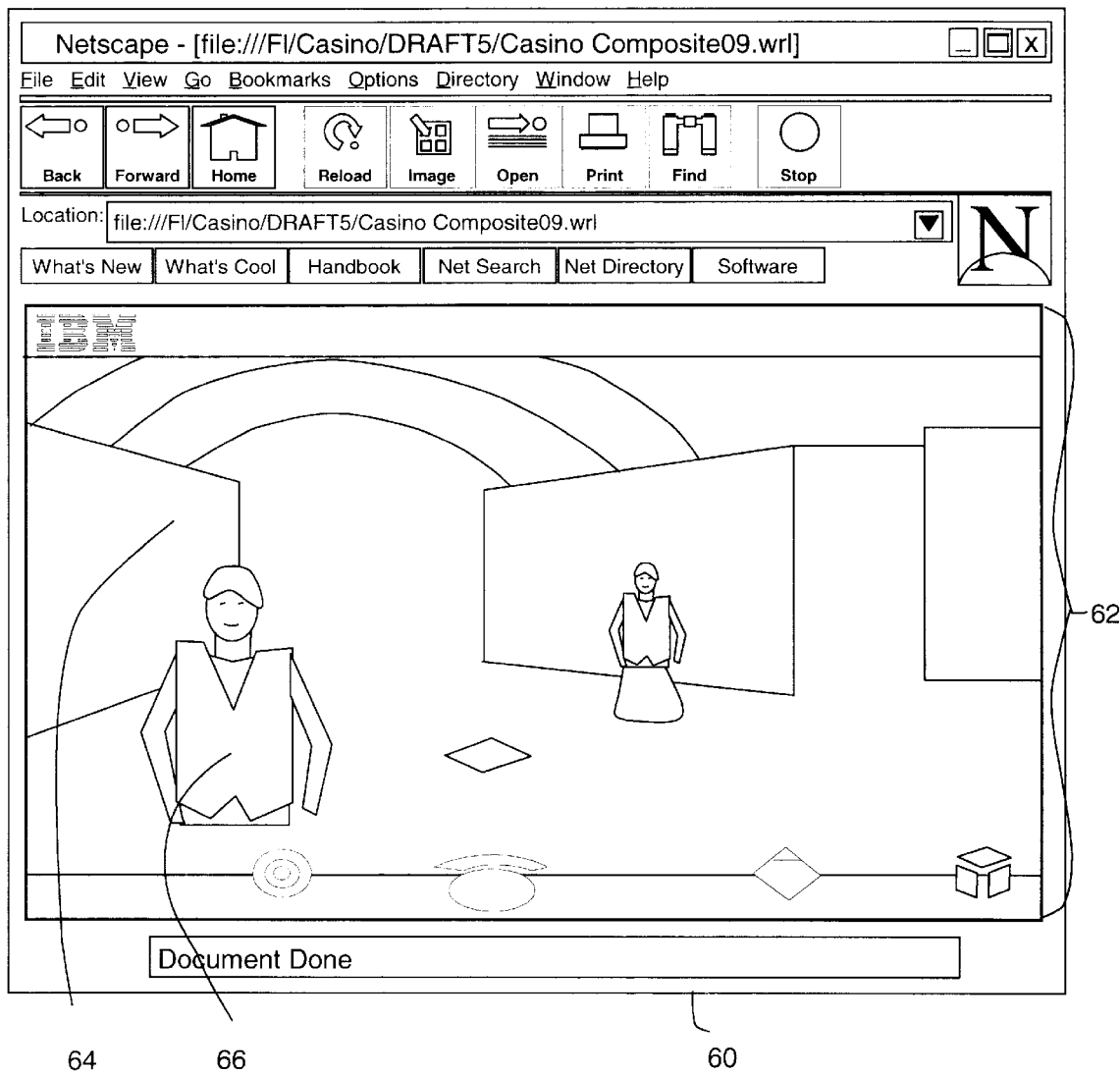
FIG. 3 illustrates an avatar participating in a virtual world.

A virtual world is logically situated as a site or document resident on a server which is accessible via the World Wide Web. In a multi-user virtual world, users are represented in the virtual world by representatives under their control, which are known as avatars. When participating in an intranetworked virtual world on the World Wide Web, the logical relationship between the browser (the client) and the server depends on the architecture of the server. Most commonly, the browser downloads the virtual world from the server, and each user's avatar logically exists within the browser and navigates through the downloaded virtual world. The user views the virtual world from his or her personal computer or the like via a VRML enabled browser from the viewpoint of the user's avatar. Information regarding the user's avatar and its movements within the virtual world are uploaded back to the server. The server updates the downloaded virtual world with information regarding the existence, appearance and movement of the avatars of other participants in the virtual world. FIG. 3 illustrates a window 60 which is displayed for a browser operating on a user's computer. A portion 62 of the window 60 shows the virtual world 64 from the perspective of the user's avatar in the virtual world. Resident in the virtual world 64 are a number of VRML defined objects. One of the objects is an avatar 66 of another participant in the virtual world 64. The avatar 66 may or may not be distinguishable from other objects which reside in the virtual world 64. For the most part, the objects in the virtual world are also VRML defined objects with which participants may interact or view while visiting the virtual world 64.

The creation of virtual worlds, VRML objects and basic avatars is known in the art and will not be discussed herein. VRML is a definition language for defining three dimensional objects for use in a three dimensional virtual world. A participant in a world walking around a VRML object would essentially view the object in three dimensions. Logic for causing actions within a virtual world can be written to a limited extent in VRML. For more significant logic, VRML script or Java Script are often used as scripting languages, or the Java language itself can be utilized. The logic for the present invention can be implemented using VRML or a combination of VRML and one or more of the other languages by a skilled programmer.

Figure 4:
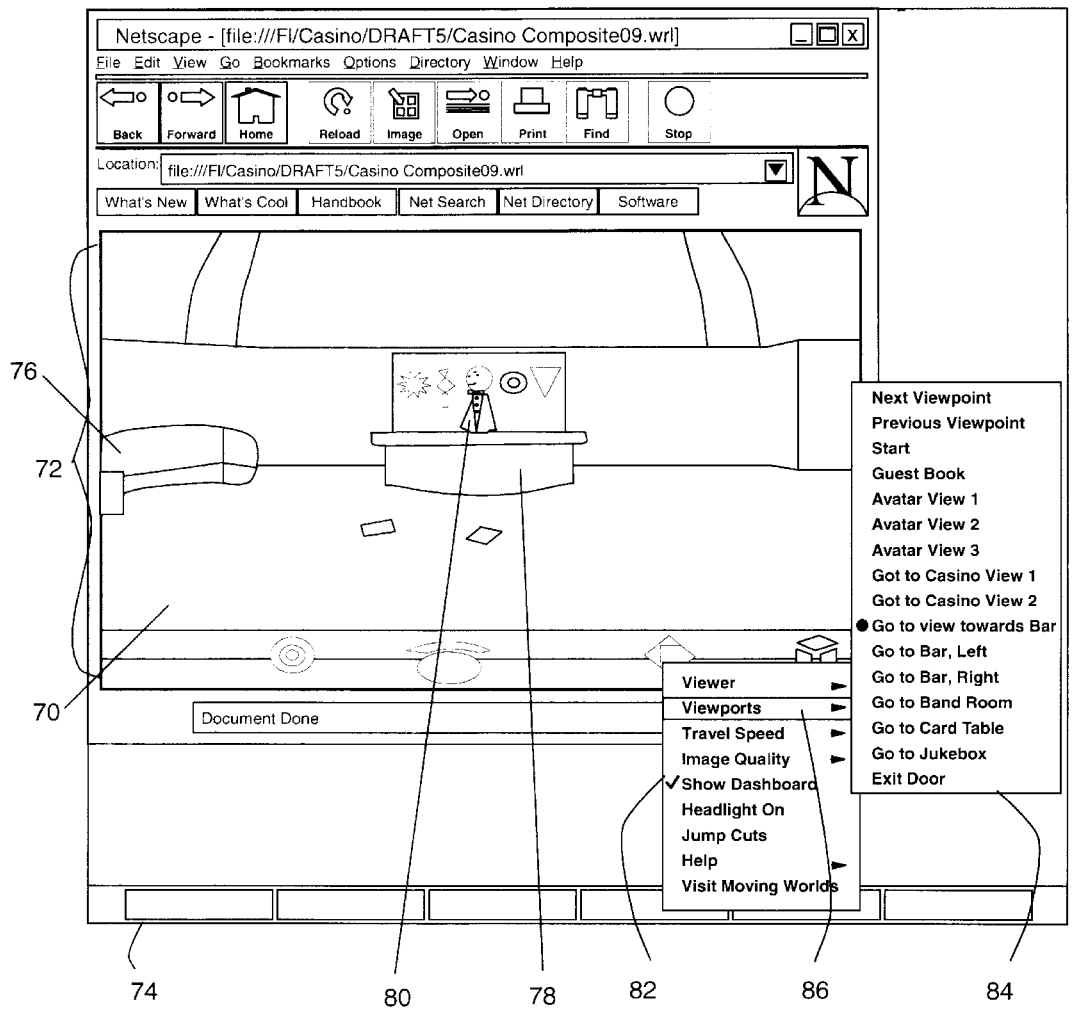
FIG. 4 illustrates a menu driven technique for navigating an avatar through a virtual world.

FIG. 4 illustrates a virtual world 70 as displayed within a portion 72 of a window 74 for a VRML enabled browser. The perspective is that of a participant within the virtual world 70; that is, this viewpoint is what the user's representative in the virtual world 70, the avatar, "sees" from the location or coordinates within the virtual world 70 at which the avatar is presently defined. The avatar may move toward a couch 76 in the virtual world 70, may navigate toward a bar 78 within the virtual world 70 in order to interact with a bartender object 80, the user may turn around and look at other parts of the virtual world 70, etc.

FIG. 4 also illustrates one existing technique for navigating through a virtual world. Navigation can be carried out via a context menu 82 and a child context menu 84. By manipulating a mouse button, user is able to cause the navigation/control context menu 82 to be displayed. The context menu 82 includes selections for navigating within the virtual world 70. By selecting a viewpoint pane/option 86 in the context menu 82, the child context menu 84 is displayed. The child context menu 84 provides a number of navigation options therein.

One problem with navigating utilising context menus is that context menus are not part of the virtual world paradigm, and thus do not fit in a virtual world and detract from the desired effect of a virtual world. The context menus 82, 84 consume valuable real estate space of a monitor displaying the window 74 and may hide things within the virtual world 70 with which a user would want to interact or see.

Figure 5:
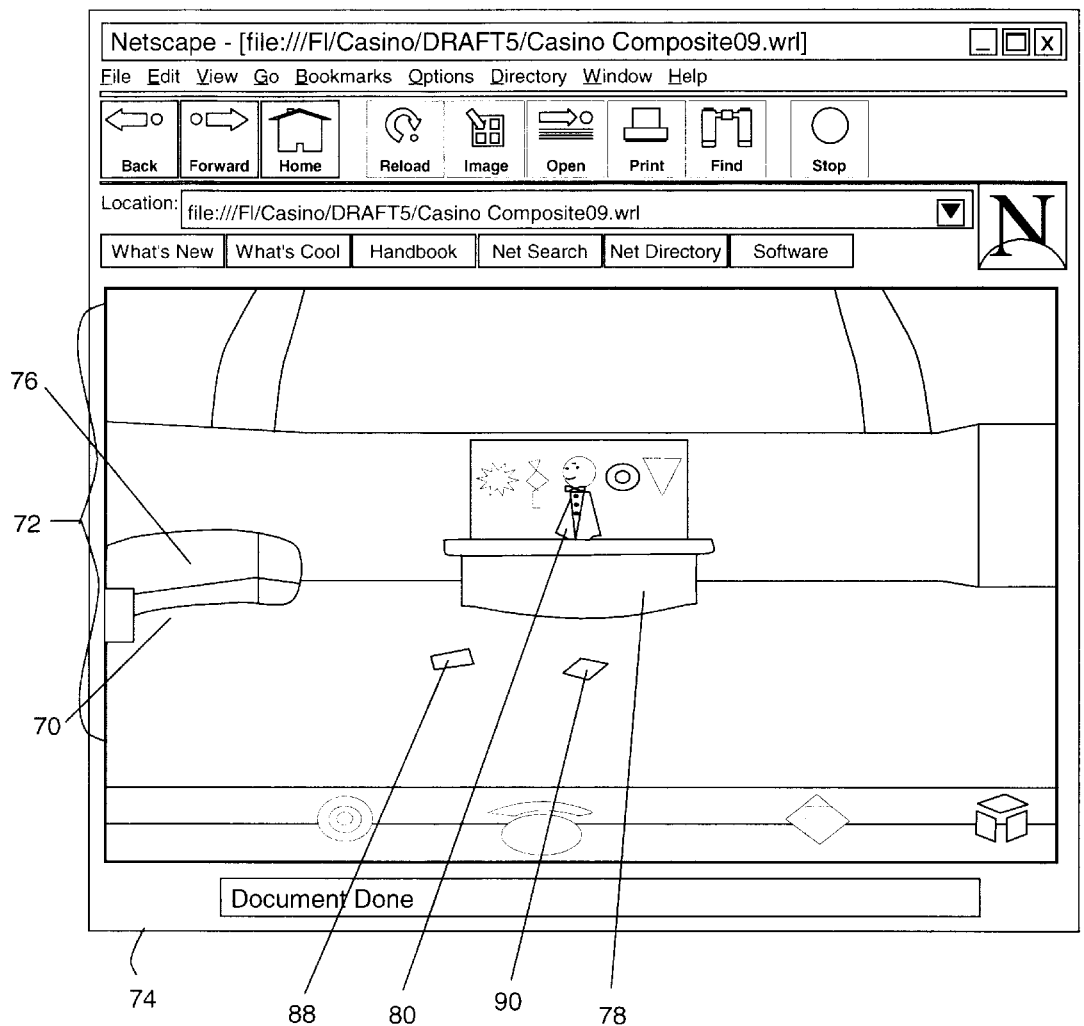
FIG. 5 illustrates a portion of a virtual world having navigation hot spots in accordance with the present invention.

FIG. 5 illustrates the virtual world 70 including a navigation solution according to the present invention which does not interfere with the virtual world paradigm. The view of the virtual world 70 in FIG. 5 is identical to that provided in FIG. 4 except that the virtual world 70 illustrated in FIG. 5 includes a pair of navigation hot spots 88 and 90 in the form of floor tiles which are visually distinguished by color from the surrounding floor. The navigation hot spots 88, 90 are designed to fit into the virtual world paradigm and need only to be distinguished slightly from the surroundings to intuitively indicate to a user that they are selectable objects or elements of the virtual world 70. A user selects one of the hotspots utilizing a known technique, such as positioning a mouse cursor and on a hot spot and clicking a mouse button. Selection of the navigation hot spot 90 causes the server in which the virtual world 70 resides to logically move the avatar of the user who selected the navigation hot spot 90 to a predetermined location. Preferably, the user is locked out of navigation control while this moving occurs, and while the moving occurs in relatively fast motion, the user via the window 74 sees the motion which brings the user's avatar to the predetermined location so that the user does not lose his or her perspective within the virtual world 70. Alternatively, the movement may be carried out in a single step such that the user's avatar is transported to the predetermined location.

Figure 6:
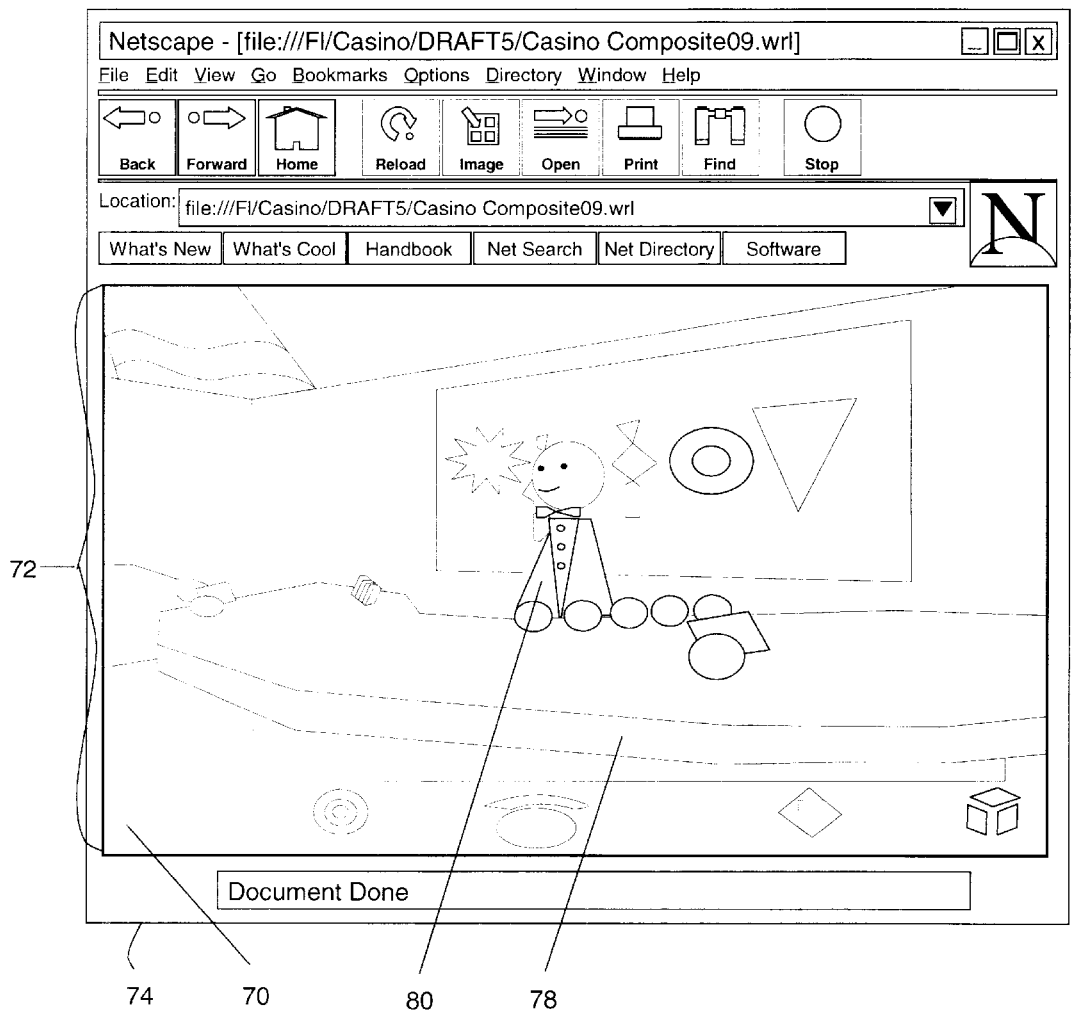
FIG. 6 illustrates of an avatar's viewpoint of in the virtual world after its user's selection of one of the hot spots and the moving of the avatar in response thereto.

As may be discerned from the viewpoint provided in the portion 72 of the window 74 of FIG. 6, selection of the navigation hot spot 90 has caused the user's avatar to move to a location proximate to the navigation hot spot 90 within the virtual world 70 so that the user's avatar is close enough to the virtual bar 78 and the virtual bartender object 80 to interact with them.

Figure 7A:
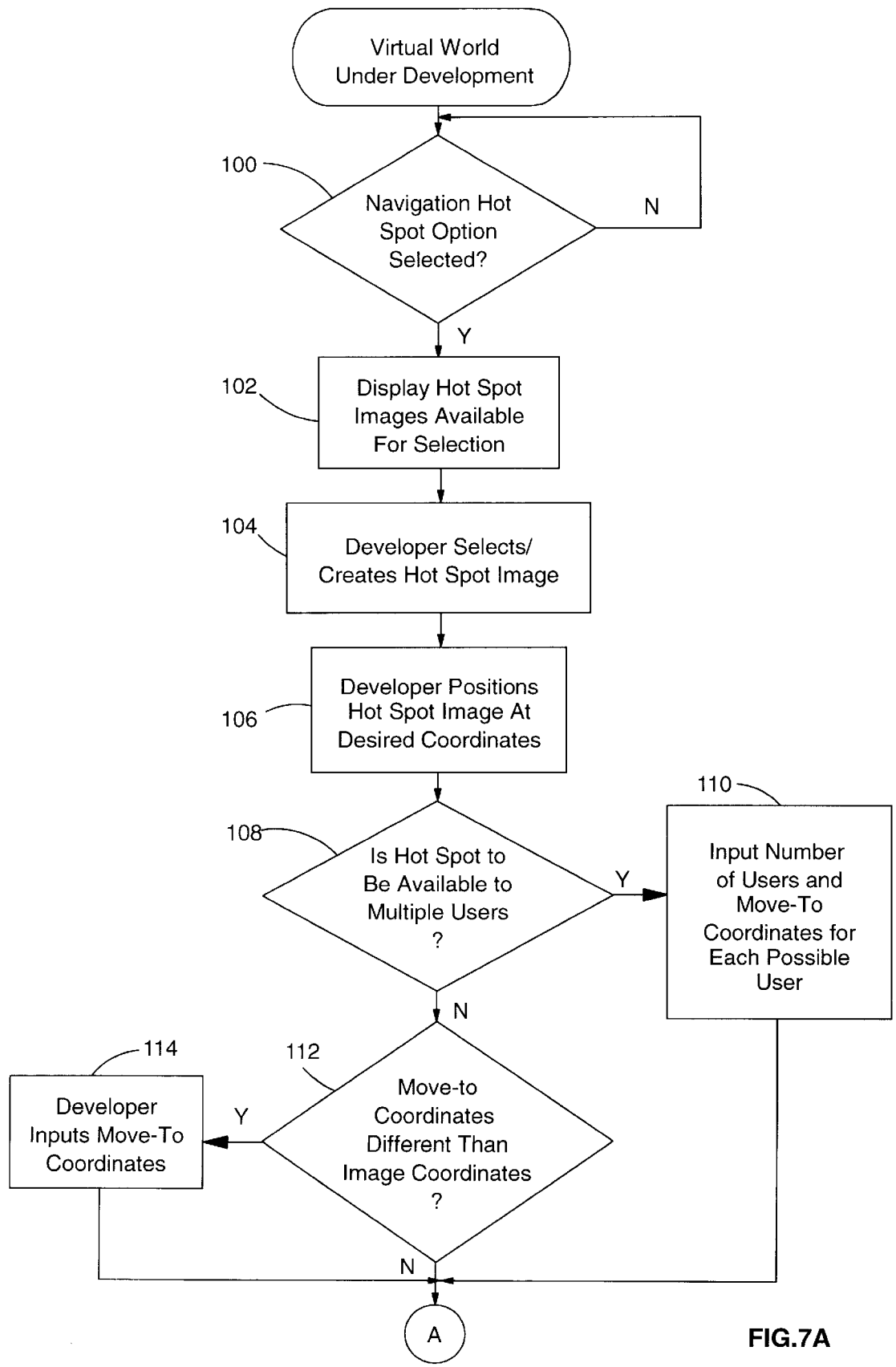
FIGS. 7A–7B illustrate a flowchart showing the logical steps involved with adding a navigation hot spot to a virtual world under development.
Figure 7B:
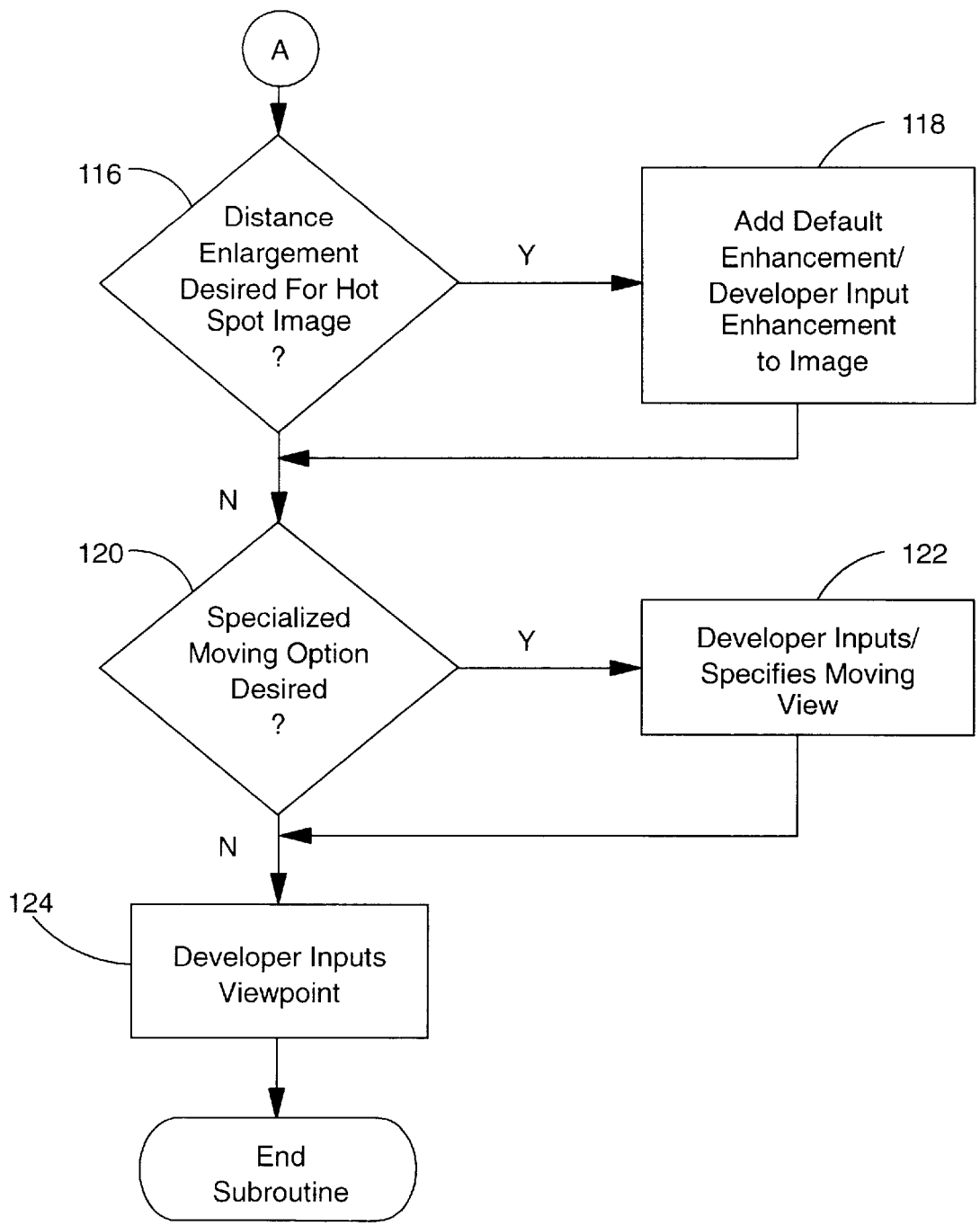

Preferred techniques for developing a virtual world which includes navigation hot spots according to the present invention and for a user to utilize the navigation hot spots will now be described with reference to the flowcharts of FIGS. 7 and 8.

It is most likely that code for adding the present invention to a virtual world will be embodied in a software tool which is used for creating virtual worlds. Such tools are used by developers for creating virtual worlds in combination with tools for creating the three dimensional objects which reside in the worlds. For example, Autodesk, Inc. produces a tool called 3D Studio Max for creating three dimensional VRML objects. In such a development environment, while the developer is using a virtual world development tool, the developer would have an option to add a navigation hot spot to the virtual world being created (Step 100). After selecting the hot spot option in Step 100, the tool preferably displays a set of selectable visual hot spot images or objects for deployment within the virtual world (Step 102). Such hot spots could take on nearly any visual representation, such as a floor tile, a sign into which a developer may input words or graphics, a door or door handle, etc., and may be two dimensional or three dimensional. Additionally, one selection preferably permits a developer to access a tool such as 3D Studio Max in order to create a desired visual representation for a hot spot. Also, a selection may be provided for permitting a developer to import an already created object to be imbued with hot spot properties (Step 104). These properties include selectability by a user to initiate navigation logic associated with the hot spot.

The developer then places the hot spot visual image at the desired coordinates within the virtual world (Step 106). This can be performed by dragging and dropping the image, inputting coordinates, etc. Next, the developer inputs the desired result which occurs when a user selects the hot spot (Steps 108–122). As default settings, selection of the hot spot by user in a multi-participant virtual world invokes logic which causes the user's avatar to move directly to the hot spot coordinates and be re-situated in the virtual world proximate to the hot spot having a designated viewpoint. FIGS. 4 and 5 illustrate before and after viewpoints a user has relative to the selection of the hot spot 90 in FIG. 4. In the viewpoint provided in FIG. 5, the user's avatar is located proximate to the hot spot 90 (which cannot be seen in FIG. 5) and is positioned such that the avatar (and the user) may interact with the virtual bar 78 and the bartender object 80. Preferably, the default settings are provided for the navigation logic to control events following user selection of a hot spots, but are subject to modification and enhancement by the developer. These settings provide for the a hot spot to become inactive following selection of the hot spot by the user, until the user moves the avatar off of the hot spot's "move-to" coordinates. By default, the coordinates of the hot spot are proximate to the move-to coordinates. The avatar is moved to the move-to coordinates such that the avatar walks to the coordinates. The user is provided with appropriate viewpoints to maintains orientation within the virtual world during the walking. The developer must provide the viewpoint of the avatar at the move-to coordinates. An example of this and options will now be discussed relative to Steps 108–124 of FIG. 7.

As per Step 108, the developer first indicates whether or not the hot spot will available to more than one user of the virtual world. That is, will the hot spot be active after a first user has selected it prior to the first user moving off of the move-to coordinates. If so, processing proceeds to Step 110, in which the developer must input the number of users which may select the hot spot and provide move-to coordinates equal to the maximum number of potential users. Once the maximum number of potential users have selected the hot spot, the hot spot becomes inactive until one of the users moves off one of the move-to coordinates. Separate move-to coordinates should be provided in order to prevent avatar overlap and maintain the desired virtual reality.

As discussed, the default move-to coordinates are preferably proximate to the hot spots image coordinates. This is only relevant if a single user only may utilize the hot spot at a time and the developer indicated in Step 108 that the hot spot was not a multiple user hot spot. Thus, in Step 112, if the developer indicates that the move-to coordinates are different than the hot spot image coordinates, the developer is prompted to input the desired move-to coordinates (Step 114). These move-to a coordinates could be any location within the virtual world, and could even be a different virtual world or Website altogether.

If only a single user hot spot is being considered as determined in Step 112, or following the input of the move-to coordinates in Step 114, or following the input of the number of users for which a hot is available and the corresponding move-to coordinates for each possible user, processing proceeds to Step 116. In Step 116, it is determined whether or not the developer desires distance enhancement to be provided for the hot spot image. A virtual world can be quite large, and a hot spot image can be quite small, especially from certain viewpoints or distances. Accordingly, in order to enhance navigation by users, it may be desired that, relative to a user at greater than a predetermined distance from a hot spot or from certain viewpoints, the hot spot be visually enhanced so that a user may more readily be able to find and select the hot spot. This involves making the hot spot image larger than it otherwise would be or reorienting the hot spot so that it can be more easily viewed by a particular user in a virtual world. If a developer indicates in Step 116 that distance enhancement is desired, processing proceeds to Step 118. Preferably, as each hot spot image was originally created for selection by a developer, the image was provided with a series of enhancement options. For example, when the hot spot is a floor tile, the floor tile is raised off the floor when a user is more than a certain distance away from the hot spot in the virtual world. Users who are less than that distance, however, would see the normal hot spot image. Alternatively, if the developer created the hot spot image or imported the hot spot image, the developer will need to create new enhanced images for use by the virtual world when enhancement is desired. This enhancement to the hot spot is intended to make the hot spot larger within the virtual world so that a user can identify it more easily and select it more easily with a mouse. This is important, as when hot spots are viewed from a distance or bad angles, they may only comprise a few pixels within the virtual world, making them very difficult to see and select via a mouse cursor and a mouse.

In either case, processing then proceeds to Step 120, at which time the developer may input any specialized moving option for the avatar. As mentioned previously, the default moving option is such that upon selection of the hot spot, moving control of the avatar is assumed by logic associated with the virtual world, and the avatar is walked directly to the move-to coordinates, with viewpoints being provided to the user corresponding to the avatar walking to the move-to coordinates. However, different options may be provided and selected by the developer in Step 122. For example, the avatar may be directly transported to the move-to coordinates. While this saves time for the user and reduces computer processing requirements, this may confuse the user or disrupt the users sense of orientation within the virtual world. Additionally, the developer may input certain routes to be taken to the move-to coordinates or specify the speed at which the avatar is moved to the move-to coordinates.

Following either Step 120 or 122, processing then proceeds to Step 124, in which the developer provides the viewpoint that the avatar will have relative to each set of move-to coordinates to which an avatar may be moved in conjunction with selection of the hot spot. This controls what the avatar will see when the avatar finally arrives at the move-to coordinates.

As discussed above, a skilled virtual reality programmer will be able to implement the code necessary to make the present invention available to a developer for inclusion in an intranetworked virtual world.

Figure 8:
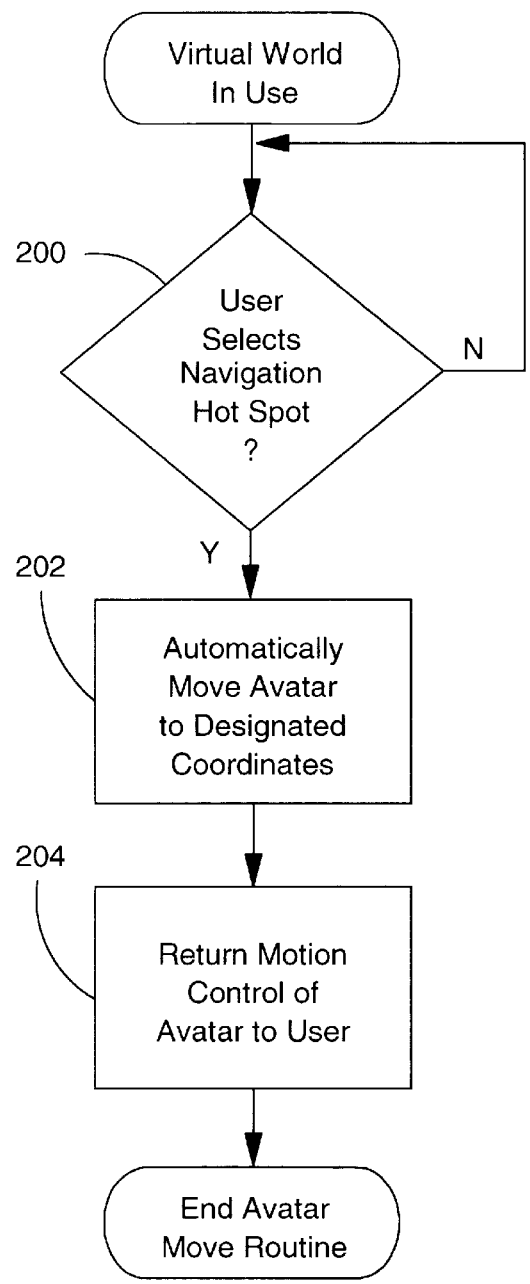
FIG. 8 is a flowchart illustrating the logical steps involved with moving an avatar after its user selects a navigation hot spot in a virtual world.

FIG. 8 illustrates the basic logical steps employed when a user or participant of a virtual world selects an active hot spot. As per Step 200, the hot spot related logic as provided by the developer does not become active until a participant in a virtual world selects the hot spot, such as through clicking a mouse button when the mouse cursor is over a hot spot. The logic associated with the hot spot then takes over the motion of the user's avatar such that the avatar is automatically moved to the coordinates associated with the hot spot by the developer (Step 202). Motion control of the avatar is then returned back to the user after the avatar is placed at the move-to coordinates (Step 204).

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. Computer readable code for providing enhanced navigation for participants in a virtual world, comprising:

first subprocesses for displaying a selectable hot spot image within a virtual world; and second subprocesses for logically moving a participant in the virtual world to pre-specified move-to coordinates within the virtual world upon the participant selecting the hot spot image.

2. Computer readable code for providing enhanced navigation according to claim 1, further comprising:

third subprocesses for making the hot spot image unselectable following selection of the hot spot image by the participant until the participant has moved off of the move-to coordinates.

3. Computer readable code for providing enhanced navigation according to claim 1, further comprising:

fourth subprocesses for associating a predetermined number of move-to coordinates with the selectable hot spot image and moving each participant to an unoccupied one of the move-to coordinates upon participant selection of the hot spot image until all of the move-to coordinates are occupied, and then rendering the hot spot image non-selectable.

4. Computer readable code for providing enhanced navigation according to claim 1, further comprising:

fifth subprocesses for providing a visually enhanced hot spot image to the participant when the participant is more than a predetermined distance from the hot spot image within the virtual world.

5. Computer readable code for providing enhanced navigation according to claim 1, further comprising:

sixth subprocesses for associating moving options with the selectable hot spot so that the participant is moved to the move-to coordinates in a predetermined manner upon selection of the hot spot image by the participant.

6. Computer readable code for providing enhanced navigation according to claim 5, wherein the predetermined manner of movement is to instantly transport the participant to the move-to coordinates.

7. In a computing environment, a system for providing enhanced intuitive navigation for users of a virtual world, comprising:

means for displaying a selectable hot spot within the virtual world, wherein the selectable hot spot has a predetermined set of navigation controls associated therewith; and means for moving a user of the virtual world in accordance with the predetermined set of navigation controls upon selection of the hot spot by the user.

8. A system for providing enhanced intuitive navigation according to claim 7, further comprising:

means for visually enhancing the hot spot for the user when the user occupies a location in the virtual world that meets predetermined enhancement criteria.

9. A system for providing enhanced intuitive navigation according to claim 7, wherein the virtual world is a VRML-based site accessible by users using VRML-enabled browsers via the World Wide Web.

10. A method for providing enhanced navigation for participants in a virtual world, comprising the steps of:

displaying a selectable hot spot image within a virtual world; and logically moving a participant in the virtual world to pre-specified coordinates within the virtual world upon the participant selecting the hot spot image.

11. A method for providing enhanced navigation according to claim 10, further comprising the step of:

making the hot spot image unselectable following selection of the hot spot image by the participant until the participant has moved off of the pre-specified coordinates.

12. A method for providing enhanced navigation according to claim 10, further comprising the step of:

associating a predetermined number of pre-specified coordinates with the selectable hot spot image and moving each participant to an unoccupied one of the pre-specified coordinates upon participant selection of the hot spot image until all of the pre-specified coordinates are occupied, and then rendering the hot spot image non-selectable.

13. A method for providing enhanced navigation according to claim 10, further comprising the step of:

providing a visually enhanced hot spot image to the participant when the participant is more than a predetermined distance from the hot spot image within the virtual world.

14. A method for providing enhanced navigation according to claim 10, further comprising the step of:

associating moving options with the selectable hot spot so that the participant is moved to the pre-specified coordinates in a predetermined manner upon selection of the hot spot image by the participant.

15. A method for providing enhanced navigation according to claim 10, further comprising the step of:

visually enhancing the selectable hot spot image for the participant when the participant occupies a location in the virtual world that meets predetermined enhancement criteria.

* * * * *

UNITED STATES PATENT AND TRADEMARK OFFICE
CERTIFICATE OF CORRECTION

| | |
|---|---|
| PATENT NO. | : 5,982,372 |
| APPLICATION NO. | : 08/746691 |
| DATED | : November 9, 1999 |
| INVENTOR(S) | : Abbott Purdy Brush, II et al. |

Page 1 of 1

It is certified that error appears in the above-identified patent and that said Letters Patent is hereby corrected as shown below:

Col. 9, Claim 1, line 6, delete "move to"

Signed and Sealed this

Twenty-seventh Day of April, 2010

David J. Kappos
*Director of the United States Patent and Trademark Office*